Jan. 3, 1950     C. MOTT ET AL     2,493,079
MOTOR SPEED CONTROL
Original Filed April 4, 1944     2 Sheets-Sheet 2
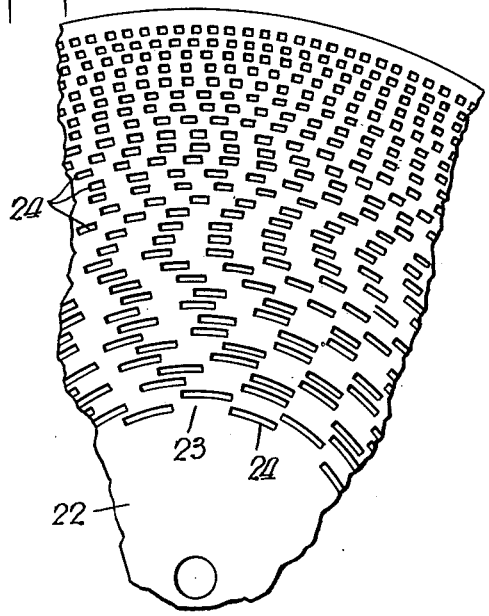
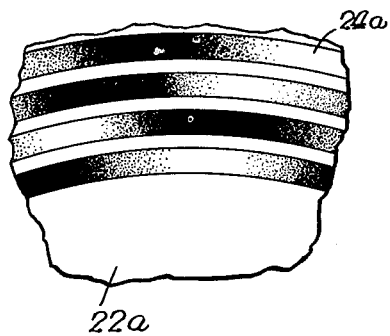
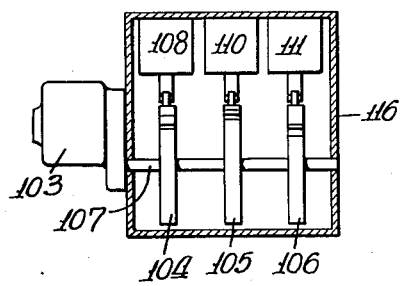
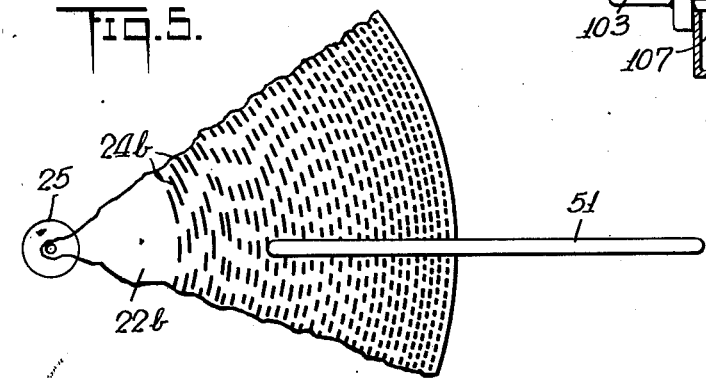
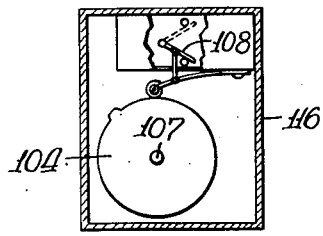
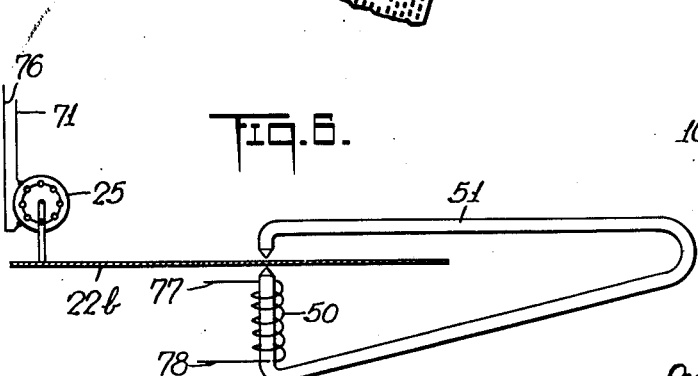
INVENTOR
*Chester Mott*
*Alfred F. Chouinard*
BY
*Dean Fairbank & Hirsch*
ATTORNEYS Patented Jan. 3, 1950

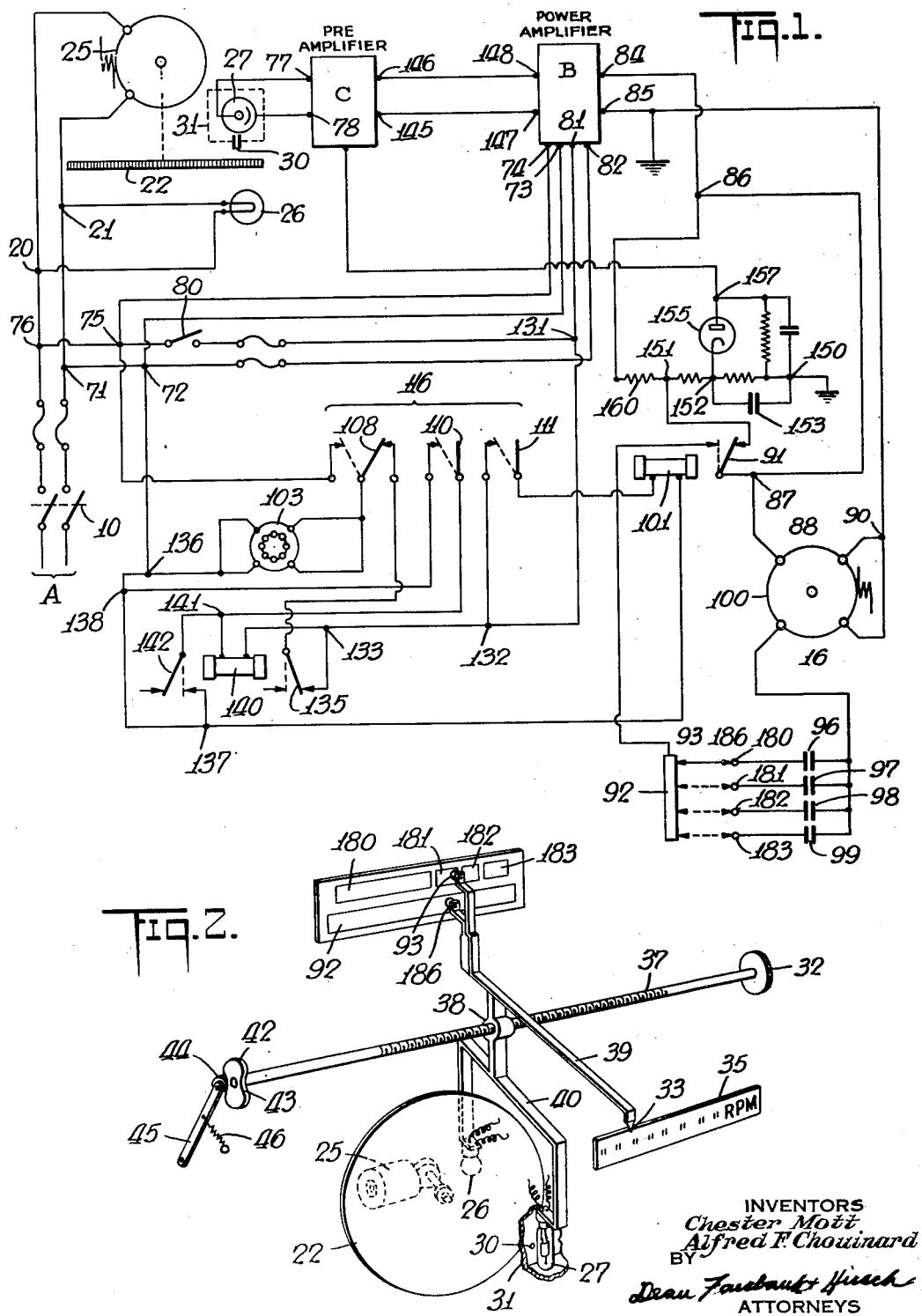

2,493,079

UNITED STATES PATENT OFFICE 2,493,079

MOTOR SPEED CONTROL

Chester Mott, Evanston, and Alfred F. Chouinard, Chicago, Ill., assignors to National Cylinder Gas Company, Chicago, Ill., a corporation of Delaware Original application April 4, 1944, Serial No. 386,874. Divided and this application February 16, 1944, Serial No. 522,566

7 Claims. (Cl. 318—313)

The present invention broadly considered relates to variable speed motors, and more particularly to means for selectively controlling the speed of such motors by adjusting the frequency of the power applied to such motors. This application is a division of our prior and copending application Serial No. 386,874, filed April 4, 1941, on which Patent 2,364,644 was issued on Dec. 12, 1944.

The speed of an ordinary series-wound electric motor may be controlled within general limits by means of a rheostat, but this speed cannot be kept constant within close limits by the rheostat or any other known means. With any given rheostat setting, the speed of the motor will vary with fluctuations in load; variations in the amount of current tapped off the line by other electrical equipment in the plant; warming up of the motor which changes the conductivity of the motor windings; warming up of the lubricating oil, which reduces its viscosity; and various other factors.

A synchronous motor will hold a definite and fixed speed, but that speed is one determined by the builder of the motor (i. e., by the number of poles), and by the frequency of the current available, which is ordinarily 60 cycles, and this speed cannot be altered or modified by the user. There are some exceptions, for instance, where the motor is of the multi-pole type, and certain poles may be cut out of the circuit, but any such cutting in or out of the poles does not permit more than a very small number of speed changes, and does not permit any small preselected variations.

It is possible to operate a synchronous motor at one definite speed and obtain various required output speeds by means of mechanical gearing. Such gearing causes loss of power through friction, and requires considerably more space to accommodate the gearing and the gear shifting mechanism than is required to accommodate the synchronous motor, especially if the range of speeds is large.

One object of the present invention is to provide means for operating a synchronous motor through a wide range of selective speeds, while maintaining any chosen speed at an extremely high degree of constancy.

Another object is to provide means for operating a synchronous motor through a wide range of selective speeds by changing the frequency of the current impressed on said motor.

Another object is to provide means for selectively changing the speed of a motor in a number of preselected steps or continuously over a wide range of speeds.

Another object is to provide means for facilitating rapid, easy and exact duplication of a given motor speed.

Various other objects, features and advantages of the invention will be apparent from the following particular description, and from an inspection of the accompanying drawings, in which:

Fig. 1 is a schematic wiring diagram of a device by means of which the speed of a synchronous motor can be selectively changed.

Fig. 2 is an illustration of a photo-electric means of generating a current of a predetermined selective frequency which may be used to control the speed of a synchronous motor.

Fig. 3 is a fragmentary plan view of a disc, forming part of the device for changing the frequency of the current to the synchronous motor.

Fig. 4 is a fragmentary plan view of another form of disc.

Fig. 5 is a plan of an electro-magnetic means for generating a current of a predetermined selective frequency which may be used to control the speed of a synchronous motor in place of the photo-electric means illustrated in Fig. 2.

Fig. 6 is an edge view of the apparatus shown in Fig. 5, the disc being shown in section.

Fig. 7 is a somewhat diagrammatic section showing a circuit controller forming a part of the electrical system of Fig. 1, and Fig. 8 is a section taken on the line 8—8 of Fig. 7.

As a feature of the present invention, the motor 16 is of the synchronous type, and the frequency of the current supplied thereto is changed in accordance with the desired motor speed. This change in frequency is effected by creating periodic current pulsations at selective frequencies, depending on the desired motor speed, and amplifying these pulsations to a value necessary to operate the synchronous motor 16.

One form of construction for obtaining current pulsations of selective frequencies is shown in Figs. 2 and 3, and comprises a disc 22 which is provided with a plurality of concentric annular series or rows of alternate opaque segments 23, and light transmitting segments 24, and which is driven at a constant speed from a synchronous motor 25 through suitable reduction gearing; the synchronous motor 25 being operated from a power source A or other suitable alternating current power.

The light transmitting segments 24 may constitute slots in an opaque disc, or the disc 22 may be of glass or other suitable transparent material, coated or fired with a black pigment, or otherwise rendered opaque at all sections except at the light transmitting segments 24.

A source of light 26 shown in the form of an exciter lamp, and a light reactive device 27 shown in the form of a shielded photo-electric cell are disposed on opposite sides of the disc 22, and are movable in unison radially of the axis of said disc into registry with any selective row of light transmitting segments 24. When one of these segments 24 moves into registry with the line of light from 26, through an aperture 30 in the shield 31 around the photo-electric cell 27, current is generated in said cell, and when an opaque segment 23 moves into said line of light, the generation of current in said cell stops. As a result, there is generated in the photo-electric cell 27 a pulsating current having a frequency depending on the number of light transmitting segments 24 in the registering row, brought into and out of position per unit of time.

The number of light transmitting segments 24 in each row varies according to the desired speed of the motor 16. For instance the inner row may have ten transparent segments 24 and ten opaque segments 23 alternately arranged. With the disc 22 making two revolutions per second, the frequency obtained by using the inner row would be 20 cycles per second (one transparent and one opaque segment constituting one cycle). The next row may be arranged to generate 22 cycles, the following row 24 cycles, and so on up to the outer row which may be arranged to generate 400 cycles. With this range of frequency available it is possible to vary the speed of the motor 16 over a 20 to 1 range. The range of frequencies generated by disc 22 would be chosen to cover the necessary range as required by any specific application of the motor 16.

Instead of providing well defined alternate opaque and transparent segments 23 and 24, as shown in Fig. 3, it is preferable to make the disc 22a as shown in Fig. 4, with the light transmitting sections 24a graded from absolute transparency to absolute opacity, to produce sinusoidal or similar forms of undulated pulsations.

As far as certain aspects of the present invention are concerned, other means may be provided for obtaining current of selective frequencies For instance, as illustrated in Figs. 5 and 6, alternating current may be induced in a coil wound on a soft iron core 51, of suitable design. The ends of the core are pointed and disposed opposite to each other on opposite sides of a steel disc 22b having a plurality of annular rows of slots. With the coil opposite one of said rows, current will be induced therein when the solid parts of the disc pass opposite said coil, the induced current diminishing to zero as the slots pass opposite said coil. The coil is so mounted as to be movable radially of the disc, and to a position opposite to any one of the rows of slots.

Also as far as certain aspects of the invention are concerned, a standard type of signal generator well known in the art can be employed to obtain minute current pulsations of selective frequency.

As a feature of the present invention, the change in frequency of the current to the motor 16 is effected by manually turning handwheel 32 as shown in Fig. 2, until pointer 33 registers with the desired setting on chart 35, chart 35 being of a well known type which has been calibrated beforehand in R. P. M. of motor 16, or with other suitable required operating information.

The transmission between this handwheel 32 and the pointer 33 may be of any desired type. The handwheel is shown as secured to an axially fixed lead screw 37 on which there is threaded a nut 38 to which is affixed an arm 39 carrying the pointer 33.

In order to correspondingly position the light source 26 and the light reactive device 27 with respect to the pointer 33, there is also rigidly affixed to nut 38, a yoke 40, with side arms carrying the members 26, 27 and 31.

In order to insure that the members 26 and 27 are stopped in proper alignment with the desired frequency control ring on the disc 22, there is provided an index device which may comprise a cam 42 secured to the lead screw 37 for rotation therewith, and provided with one or more recesses 43. A roller 44 carried on a pivot arm 45 is urged against the periphery of the cam 42 by a spring 46. When the roller 44 is in one of the recesses 43, the light 26 and the light reactive device 27 will be in proper alignment with one of the frequency control rows. The operator can tell when this position is reached by the feel of the handwheel 32 as it turns easily into correct position, and greater resistance is encountered in moving the cam out of a correct position. Obviously, the U-shaped core bar 51 shown in Figs. 5 and 6 could be secured to the nut 38 in place of the yoke 40.

All of the parts shown in Fig. 2 are mounted in a suitable manner, preferably in a casing or housing with the chart 35, and the pointer 33 being readily visible from the outside, and the end of the lead screw 37 bearing the handwheel 32 brought to the outside to facilitate selection of the desired speed. To facilitate a clear showing of the parts appearing in Fig. 2, they have been spread apart, and in somewhat different relative positions than they would occupy in commercial practice. Various other operating connections may be employed.

In Fig. 1 is shown a wiring diagram of a form of electrical system which may be employed for amplifying the minute current pulsations generated in the photo-electric cell 27 to a value necessary to operate the synchronous motor 16. In this system, the main input lines A are connected to a commercial source of alternating current which is usually 60 cycles, 115 volts. When main switch 10 is closed, power is available for operation of the device.

Current flows from the left branch of the main A through points 76 and 20, through the motor 25, through points 21 and 71, back to the right branch of the main A. The current available at point 21 flows through the filament of the exciter lamp 26 and returns to point 20 on the main. The minute current pulsations generated by the photo-electric cell 27 are delivered to the pre-amplifier C through points 77 and 78.

The current is branched off from point 71 on one line of the main to points 72 and 73, through various transformers of a power amplifiers B of well known construction, to reduce the voltage to values suitable for operation of the tube filaments in said amplifier, and also to supply power to the tubes in a pre-amplifier C of well known construction in the art. The current then returns to points 74 and 75, and then to point 76 on the return line of the main.

Current from the main A is also delivered through a motor stop and start switch 80 in closed position thereof, to point 81, to the primary of a power input transformer in the power amplifier B, returning to point 82, and then to main A.

When current flows in the primary of this power input transformer, there are induced in the secondary windings, high voltages necessary for the operation of the power amplifier B and the pre-amplifier C in the well known manner. These high voltages supply alternating current that is rectified through suitable means in the power amplifier B and applied to the plates of the various thermionic tubes employed.

With the disc motor 25 revolving the frequency control disc 22, and the exciter lamp 26 focused on the photo-electric cell 27, and the filaments of the various vacuum tubes supplied with their proper voltages, it is only necessary to supply high voltages of direct current to obtain a power output from the power amplifier B, and available between points 84 and 85.

The frequency of the current of said power output is determined by the frequency control disc 22. This current flows from point 84 through points 86 and 87, through the running winding 88 of the synchronous motor 16, through point 90, and returns to point 85. There is also a parallel path from the point 84 through points 86 and 87, through contact 91 in the dotted line position shown, through a conductor strip 92, through a contact arm 93, through one of the starting condensers 96, 97, 98, 99, for the motor 16, through the starting winding 100 of the synchronous motor 16, through point 90, and back to point 85. A relay 101 controls the timing closure of the contact 91, as will be described.

The motor 16 is of the capacitor start type requiring one of the condensers 96, 97, 98, 99 in series with the starting winding 100, as will before fully described. When a standard motor of this type is used on a standard commercial frequency, the motor rotor is equipped with a centrifugal throw-out switch in the circuit of the starting winding 100. If a motor has been designed to run at a synchronous speed of 1800 rotor revolutions per minute, then the centrifugal throw-out switch is so designed as to be opened or thrown out at approximately 1200 rotor revolutions per minute. In the application of this type of capacitor start motor with frequency control, the standard type of centrifugal throw-out switch would not be suitable, as the rotor must at times be rotating at synchronous frequencies as low as 600 revolutions per minute, and as high as 12,000 revolutions per minute.

It is common knowledge to those versed in the art that the power generated by the starting winding 100 must be available to bring the motor rotor up to nearly synchronous speed, and the rotating electrical field which determines the synchronous rotating speed of the motor must be allowed to keep the rotor in step at this frequency. It is not important that the starting winding 100 be cut off elecrically just before the motor rotor attains synchronous speed, but it is necessary that said starting winding remain connected long enough to bring the rotor almost up to synchronous speed at the highest frequency. It is also necessary that the starting winding 100 be cut off after the rotor has reached almost synchronous speed to allow the motor to rotate solely by the effect generated by the running winding 88. To apply the current to the starting winding 100 long enough to bring the rotor up to nearly synchronous speed at the highest frequency which may be as high as 400 cycles, and cutting it off electrically at this point, there is provided a synchronous timing motor 103, and a cam switch device 116 operated from said timing motor.

The cam switch device 116 comprises three cams 104, 105, and 106 mounted for rotation in unison on a shaft 107, driven from the timing motor 103 as shown in Figs. 7 and 8. The cam 104 is adapted to operate a switch 108 into the solid line or the dotted line position shown in Figs. 1 and 8, so that when one of said positions is opened, the other is closed. Two other switches 110 and 111 are operated from the cams 105 and 106 into the solid line or dotted line position shown in Fig. 1. The three cams 104, 105 and 106 are designed to move the switch 108 to the solid line position from 0° to 10° of rotation during one revolution of the cams; move switch 108 to the dotted line position from 11° to 360°; move switch 110 to the dotted line position from 355° to 360°; and move the switch 111 to the dotted line position from 15° to 225°. During the other portions of the timing cycle, switches 110 and 111 are in the solid line position.

When the motor start and stop switch 80 is closed, current is not only rendered available to the power input transformers through points 81 and 82, as hereinbefore described, but current also flows from point 131 to points 132 and 133, through contact 135 and switch 108 in the solid line position, through the timing motor 103 to rotate said motor, to points 136 and 72, and back to the main line at point 71. Switch 108 is in the solid line position from 0° to 10° during rotation of the cams, and is moved to the dotted line position between 10° and 11°. The switch 108 is of the quick action type, and is so constructed that it is either in the solid line or dotted line position with no intermediate position except during a small fraction of a second required to effect the switch-over. With switch 108 in the dotted line position shown, the current does not have to flow through the motor stop and start switch 80 to continue rotation of the timing motor 103 through the remainder of its timing cycle, but will flow from point 76 on one line of the main A, through point 75, through switch 108 in the dotted line position, through the timing motor 103, through points 136 and 72, to point 71 on the other line of main A.

It is sometimes necessary to supply power to synchronous motor 16 for only a short interval of time; for instance to move the device it drives to a desired position. This is accomplished by closing switch 80 to supply power to motor 16, and at the appropriate time, reopen switch 80, thereby cutting off the supply of power to motor 16.

The action of switch 108 allows the motor start switch 80 to be opened to stop the drive motor 16, yet providing current to be supplied to the timing motor 103 to return it to its original 0° position.

Switch 111 supplies current to the relay coil 101, and for that purpose is closed from 15° to 255° of cam rotation as described, to provide current flow through switch 80, through points 131 and 132, through switch 111 in dotted line position shown, through relay coil 101, through points 137, 138, 136 and 72 and to point 71 on main A. The energization of the relay coil 101 causes movement of the contact 91 to the dotted line position shown, and thereby causes flow of current to the starting winding 100 from the output of the power amplifier B, as already described.

The purpose of switch 110, which is closed from 355° to 360° of cam rotation, is to energize a timing relay 140 to open the circuit of the timing motor 103, and thereby allow said motor to rotate only through one timing cycle. When this switch 110 is closed to the dotted line position shown, current will flow through switch 80, through points 131, 132 and 133, through relay coil 140, through point 141, through switch 110, through points 138, 136 and 72, and to point 71 on the main line. Relay coil 140 will now become energized closing a contact 142 to the dotted line position shown, and opening contact 135 into dotted line position shown. When contact 142 is closed, the current does not have to flow from point 141, through switch 110, through points 138, 136 and 72 and on to point 71 on the main, but flows directly from point 141, through contact 142, through points 137, 138, 136 and 72 and on to 71 on the main. When contact 135 is open in dotted line position shown, it does not allow current to flow through switch 108 in the solid line position shown. This switch 108 however is in the dotted line position from 355° to 360° to deliver current to the timing motor 103. Thus the timing motor 103 will continue to rotate until switch 108 is moved to the solid line position. Then at 360°, switch 108 will be moved from the dotted line position to the solid line position, but due to contact 135 being opened by virtue of the relay coil 140 being energized, the timing motor will come to rest at its normal position, but is ready at any time thereafter to repeat its timing cycle.

The rotation of the timing motor 103 through one complete cycle takes about six seconds. Switch 111, which controls current to the starting winding 100, is closed for about four seconds. That is sufficient time to bring the rotor of the drive motor 16 to synchronous speed at the maximum frequency of 400 cycles.

If it is desired to maintain the useful wattage employed by the motor 16 constant at all frequencies, an attenuating network may be inserted between points 145 and 146 of the pre-amplifier, and points 147 and 148 of the power amplifier, in the manner disclosed in applicants' copending application, Serial No. 386,874, now Patent No. 2,364,644.

When the switch 80 is closed to start the synchronous motor 16, current will flow from point 84 through points 86 and 87, through the motor running winding 88, through point 90, and returns to point 85. Current also flows from point 87 to contact 91. It is assumed that motor 16 is just being started, so that relay coil 101 will become energized for the duration of time necessary to provide current through the starting winding 100. When relay coil 101 is energized, contact 91 is in dotted line position shown in Fig. 1, which means that current continues on the path through contact 91 in the dotted line position, through conductor strip 92, through switch 93, through one of the starting condensers 96, 97, 98, 99, through the starting winding 100, through point 90 and returns to point 85.

Points 85 and 150 are grounded, so that the voltage between points 150 and 86 is found equal to that between points 84 and 85. A slightly lower voltage exists between points 150 and 151, and a still lower voltage between points 150 and 152.

A condenser 153 is connected across the points 150 and 152. It is a well known action of condensers in alternating current circuits, that their impedance decreases with an increase in frequency. Therefore, if the frequency generated by the frequency control disc 22 is raised, the voltage between points 150 and 152 will be lowered, and if the frequency is lowered, the voltage between these points will be raised.

This condenser action is utilized by use of a diode rectifying vacuum tube 155, which allows negligible current to flow through it in one direction only. The output from this tube at point 157 flows to the pre-amplifier C, to control the amount of amplification of the pre-amplifier C. The voltage obtainable in this manner from point 156 is applied to a control grid of one of the amplifying tubes in the pre-amplifier C, and controls the output voltage in such a manner that the output voltage is proportional to its frequency. This automatic device regulates the overall amplification value of the preamplifier in such a manner that the output voltage is always the correct value for each operating frequency.

It is desirable to employ a slightly higher voltage on the drive motor 16 during the starting period. For that purpose there is provided a resistor 160 between points 86 and 151, and a contact 91, which when in the solid line position shown, short circuits this resistor 160. This contact 91 will always be in the solid line position when relay coil 101 is not energized.

During part of the timing cycle, the relay coil 101 is energized, so that the contact 91 across the resistor 160, will be in the dotted line position shown. With this contact 91 in the dotted line position, the percentage of voltage drop between points 150 and 152 will be lowered, and the ultimate control voltage applied along the output wire at the point 157 will be lowered. With a lower control voltage applied to the pre-amplifier from point 157, the actual output voltage will be slightly higher than it would be without the series resistor 160 connected in the circuit.

Upon de-energization of the relay coil 101, the contact 91 is moved to the solid line position, so that resistor 160 will be short-circuited, and the actual output voltage lowered.

The synchronous driving motor 16 is of the capacitor start type, requiring a starting condenser in series with the starting winding 100. The purpose of this condenser is to obtain an amount of electrical shift of the phase, depending upon the frequency of the applied current and the capacity of said condenser.

With the wide range of frequencies employed in operating motor 16, it has been found that the higher the frequency, the lesser the capacity required. For synchronous motor operation from 20 to 400 cycles, it has been found that four condensers, 96, 97, 98 and 99, of different capacity, are required to cover this range of frequencies.

For instance, condenser 96 has proper capacity for frequencies from about 20 to 100 cycles per second; condenser 97 for frequencies of about 100 to 200 cycles; condenser 98 for frequencies of about 200 to 300 cycles, and condenser 99 for frequencies of about 300 to 400 cycles.

The proper condenser is connected in series with the starting winding 100 by the same mechanism, which shifts the exciter lamp 26 and photo-electric cell 27 into registry with a selected row of the frequency control disc 22. For that purpose four terminal strips, 180, 181, 182 and 183, connected to condensers 96, 97, 98 and 99, respectively, are mounted alongside of each other as shown in Fig. 2, while a conductor strip 92 is mounted below said terminal strips. Rigid with the arm 39 are a pair of switch blades 93 and 186 carrying brushes riding in electrical contact with the upper and lower strips, and serving to connect the proper condenser in series with the starting winding 100.

To generate three phase alternating current, three identical frequency control discs would be mounted on the shaft of a single synchronous motor 25. Each disc would be provided with a light source and photocell combination, but with all three lamps and photo-electric cells mechanically tied together. If the light focused on the first control disc was just commencing to pass through the light transmitting section, and on to the first photo-electric cell, then the second control disc would be so arranged that it would be one-third of a cycle behind the first disc, and the third disc would be one-third of a cycle behind the second disc. With three separate frequency control discs and three separate amplifier units, it is possible to generate three alternating currents whose phase relationship has been determined by the mechanical arrangement of the three frequency discs. To shift to another frequency, it would only be necessary to mechanically shift the three photo-electric cell combinations in registry with the desired annular frequency control row.

As many changes could be made in the above method and apparatus, and many apparently widely different embodiments of this invention could be made without departing from the scope of the claims, it is intended that all matter contained in the above description or shown in the accompanying drawings shall be interpreted as illustrative, and not in a limiting sense.

Having thus described our invention, what we claim as new and desire to secure by Letters Patent is:

1. Method of controlling the speed of a synchronous driving motor having a capacitor starting winding and a running winding, which includes the steps of generating periodic current pulsations at a single, constant, preselected frequency corresponding to the desired speed of the motor; amplifying said current to a value sufficient to operate said motor; delivering the amplified current initially to both the starting and running windings of the motor at the preselected frequency; automatically controlling the voltage of the amplified current in proportion to the preselected frequency; and automatically disconnecting the starting winding when the motor reaches a speed sufficient to permit it to continue synchronous operation at the speed corresponding to the frequency of the amplified current.

2. Method of controlling the speed of a synchronous driving motor having a capacitor starting winding and a running winding, which includes the steps of interrupting a beam of light at regular and uniform intervals of a single, constant, preselected frequency; generating an alternating current of said preselected frequency by the action of said light beam; amplifying said current to a value sufficient to operate said motor; delivering the amplified current initially to both the starting and running windings of the motor at the preselected frequency; automatically controlling the voltage of the amplified current in proportion to the preselected frequency; and automatically disconnecting the starting winding when thte motor reaches a speed sufficient to permit it to continue synchronous operation at the speed corresponding to the frequency of the amplified current.

3. In combination, a synchronous motor having a capacitor starting winding and a running winding; a generator for producing periodic current pulsations at a single, constant, preselected frequency corresponding to the desired speed of the motor; means to vary and select the single, constant frequency of current delivered by said generator; means to amplify said current to a value sufficient to operate said motor; circuit means to deliver the amplifying current initially to both said starting and running windings of the said motor at the preselected frequency; means to correlate the voltage of said amplified current in proportion to said preselected frequency; and circuit interrupting means to disconnect said starting winding when said motor reaches a speed sufficient to permit it to continue synchronous operation at the speed corresponding to the frequency of said amplified current.

4. In combination, a synchronous driving motor having a capacitor starting winding and a running winding; a light reactive device for generating an alternating current; a light source arranged to project light on to said light reactive device; means for periodically interrupting the passage of light from said source to said device at a single, constant, preselected frequency to generate current in said device at a frequency corresponding to the desired speed of said motor; selector means to vary the period of interruption of the passage of light from said source to said device in accordance with the single, constant, preselected desired speed of said motor; means for amplifying said current to a value sufficient to operate said motor; circuit means to deliver the amplified current initially to both said starting and running windings of said motor at said preselected frequency; automatic circuit means for correlating the voltage of said amplified current in proportion to said preselected frequency; and automatic means for disconnecting said starting winding when said motor reaches a speed sufficient to permit it to continue synchronous operation at the speed corresponding to the frequency of said amplified current.

5. Means for producing an alternating current of different frequencies for operating a synchronous motor at different speeds, including a light source, a light reactive device for generating current, a screen between said light source and said light reactive device having a series of rows of spaced obstructions preventing the passage of light therethrough, the obstructions of each row being repeated at equal spaced intervals, different from those of the other rows, said screen being movable across the path of light between said light source and said light reactive device and in a direction to bring and maintain a selected one of said rows of obstructions continuously in said light path, whereby current pulsations are generated in said device having a frequency depending on the frequency with which said obstructions pass through said light path, means for adjustably moving said screen relatively to said light reactive device and said light source to selectively bring any one of said rows of light varying obstructions into said light path, means for amplifying the current pulsations in said device to a value for motor operations, and delivering the amplified current to the motor to operate the latter at a fixed speed determined by the particular row of light obstructions which are in the path of the light beam.

6. An apparatus for controlling the speed of a synchronous motor comprising a light source, means including a light reactive device for generating current pulsations, a disc between said light source and said light reactive device having a series of annular concentric rows of light varying obstructions, the obstructions of each row being repeated at equal spaced intervals, different from those of the other rows, means for rotating said disc at a uniform speed, means for relatively adjusting said screen with respect to said light reactive device and said light source to selectively bring any one of said rows of light varying obstructions into the path between said light source and said light reactive device, whereby the resulting light variations on said device generate current pulsations having a frequency depending on the frequency with which said obstructions pass through said light path, means for amplifying the current pulsations to a value for motor operations, and means for delivering said amplified current pulsations of the selected frequency to said motor to operate said motor at the desired selected and corresponding speed.

7. An apparatus for controlling the speed of a synchronous motor comprising a light source, means including a light reactive device for generating current, a disc between said light source and said light reactive device having a series of annular concentric rows of light obstructions, the obstructions of each row being repeated at equal uniformly spaced intervals, different from those of the other rows, means for rotating said disc at a uniform speed, an indicating device, an operating member, means responsive to the operation of said member for moving said indicating device into selected indicating position and for simultaneously and automatically moving said light reactive device and said light source with respect to said screen to bring the row of light obstructions corresponding to the indicating position of said indicating device into the path of light between said light source and said light reactive device, whereby the resulting light variations on said light reactive device generate current pulsations having a frequency depending on the frequency with which said obstructions pass through said light path, means for amplifying the current pulsations to a value for motor operations, and means for delivering said selected amplified current pulsations to said motor to operate said motor at the desired selected speed.

CHESTER MOTT.
ALFRED F. CHOUINARD.

REFERENCES CITED

The following references are of record in the file of this patent:

UNITED STATES PATENTS

| Number | Name | Date |
| --- | --- | --- |
| 1,408,758 | Meyer | Mar. 7, 1922 |
| 1,678,872 | Potter | July 31, 1928 |
| 1,684,236 | Macmillan | Sept. 11, 1928 |
| 1,819,820 | Kent | Aug. 18, 1931 |
| 1,860,502 | Hansen | May 31, 1932 |
| 2,169,842 | Kannenberg | Aug. 15, 1939 |
| 2,257,158 | Cooley | Sept. 30, 1941 |
| 2,340,875 | Gibbs | Feb. 8, 1944 |